(12) United States Patent
Aoyama et al.

(10) Patent No.: US 12,233,538 B2
(45) Date of Patent: Feb. 25, 2025

(54) SUPPLY DEVICE FOR SHAFT-LIKE COMPONENT

(71) Applicant: Shoji Aoyama, Osaka (JP)

(72) Inventors: Shoji Aoyama, Osaka (JP); Yoshitaka Aoyama, Osaka (JP)

(73) Assignee: Shoji Aoyama, Osaka (JP)

( * ) Notice: Subject to any disclaimer, the term of this patent is extended or adjusted under 35 U.S.C. 154(b) by 413 days.

(21) Appl. No.: 17/766,053

(22) PCT Filed: Oct. 27, 2020

(86) PCT No.: PCT/JP2020/040258
§ 371 (c)(1),
(2) Date: Apr. 1, 2022

(87) PCT Pub. No.: WO2021/085418
PCT Pub. Date: May 6, 2021

(65) Prior Publication Data
US 2022/0371206 A1    Nov. 24, 2022

(30) Foreign Application Priority Data
Oct. 30, 2019    (JP) .................................. 2019-209116

(51) Int. Cl.
*B25J 15/06*    (2006.01)
(52) U.S. Cl.
CPC ................................ *B25J 15/0608* (2013.01)
(58) Field of Classification Search
CPC ........ B25J 15/0608; B65H 3/08; B23P 19/00; B23K 11/00
(Continued)

(56) References Cited

U.S. PATENT DOCUMENTS

| 1,358,725 | A | * | 11/1920 | Gaynor | ................... B65B 35/06 |
| | | | | | 59/1 |
| 1,772,105 | A | * | 8/1930 | McGill | .................... B23Q 3/16 |
| | | | | | 451/337 |

(Continued)

FOREIGN PATENT DOCUMENTS

| CN | 204735838 | | 11/2015 | | |
| CN | 204735838 | U | * 11/2015 | ............. B23K 9/206 |

(Continued)

OTHER PUBLICATIONS

International Search Report issued Dec. 22, 2020 in International (PCT) Application No. PCT/JP2020/040258.
(Continued)

*Primary Examiner* — Rakesh Kumar
(74) *Attorney, Agent, or Firm* — Wenderoth, Lind & Ponack, L.L.P.

(57) ABSTRACT

A shaft-like component supply device has a form in which a component supply pipe and an outer cylinder are intersected at an acute angle and coupled. A supply rod holds and advances a shaft-like component at a distal end and releases the shaft-like component at a target location. Meanwhile, component transfer from the outlet hole of the component supply pipe to the distal end of the supply rod is performed by the attraction force of a magnet. The supply rod includes an inner shaft mounted with a magnet and a hollow shaft. A first drive device that advances and retracts a holding piece and a second drive device that pulls back the magnet of the inner shaft in a direction away from the distal end of the supply rod are coupled to a single holding member mounted near a distal end part of an outer cylinder.

1 Claim, 5 Drawing Sheets

(58) Field of Classification Search
USPC .................................................. 221/212, 278
See application file for complete search history.

(56) References Cited

U.S. PATENT DOCUMENTS

| | | | | |
|---|---|---|---|---|
| 3,067,852 | A * | 12/1962 | Barr | B65G 47/1485 198/398 |
| 3,178,740 | A * | 4/1965 | Dorak | B23G 1/16 408/11 |
| 3,195,773 | A * | 7/1965 | Hopkins | B23Q 7/04 221/212 |
| 3,520,009 | A * | 7/1970 | Hoefener | B23G 1/16 408/9 |
| 3,610,767 | A * | 10/1971 | Nutt | B23G 1/16 408/137 |
| 3,838,934 | A * | 10/1974 | Petroff | B23Q 16/00 408/137 |
| 3,951,305 | A * | 4/1976 | Rondas | B65G 47/1485 221/212 |
| 4,943,098 | A * | 7/1990 | Aoyama | B65G 47/92 414/737 |
| 5,291,645 | A | 3/1994 | Aoyama | |
| 5,372,279 | A * | 12/1994 | Aoyama | B23P 19/006 470/167 |
| 6,471,094 | B2 * | 10/2002 | Saito | H05K 13/028 221/210 |
| 7,850,040 | B2 * | 12/2010 | Davis | G07F 17/163 226/110 |
| 9,604,327 | B2 * | 3/2017 | Iwamoto | B25B 23/04 |
| 9,963,304 | B2 * | 5/2018 | Hodde | B65G 47/24 |
| 9,999,949 | B2 * | 6/2018 | Hester | B23P 19/003 |
| 2014/0151393 | A1 * | 6/2014 | Simpson | B23P 19/004 221/212 |

FOREIGN PATENT DOCUMENTS

| | | | | |
|---|---|---|---|---|
| JP | | 3-178740 | 8/1991 | |
| JP | | 5-23865 | 2/1993 | |
| JP | | 2000-167730 | 6/2000 | |
| JP | | 2000167730 A * | 6/2000 | B23K 9/206 |
| JP | | 2015-205341 | 11/2015 | |
| WO | WO-2021085418 A1 * | | 5/2021 | B23K 9/206 |

OTHER PUBLICATIONS

Office Action issued Nov. 7, 2023 in corresponding Chinese Patent Application No. 202080074679.2, with English language translation of the Search Report.

International Preliminary Report on Patentability and Written Opinion of the International Searching Authority issued May 3, 2022 in International (PCT) Application No. PCT/JP2020/040258.

Extended European Search Report issued Oct. 16, 2023 in corresponding European Patent Application No. 20883353.3.

* cited by examiner

SUPPLY DEVICE FOR SHAFT-LIKE COMPONENT

TECHNICAL FIELD

The present invention relates to a shaft-like component supply device that supplies a shaft-like component transferred from a component supply pipe to a distal end of a supply rod to a target location.

BACKGROUND ART

JP 2000-167730 A describes a shaft-like component supply device shown in FIGS. 1 to 6.

Hereinafter, the invention described in the above patent publication is described.

The shaft-like component described here is a long projection bolt 1 made of iron, which is magnetic material, and includes a circular flange 3 having a welding protrusion 2 and a shaft 4 having a circular cross section and formed with a male screw.

In the following description, the projection bolt may be simply referred to as a bolt.

The supply rod 5 performing an advancing and retracting stroke holds the shaft-like component 1 at a distal end thereof, has a distal end surface 6 (denoted by a reference sign 6 in FIG. 2) with which the flange 3 is in close contact, and is formed with a circular arc-shaped stopper piece 7 as apparent from FIG. 6 on an outer peripheral portion thereof. A recess 8 is formed at the center of the distal end part of the stopper piece 7 so as to receive the shaft 4 as described later. The supply rod 5 is inclined with respect to the vertical line.

The bolt 1 has the flange 3 with the diameter of 17 mm and the shaft 4 with the diameter and length of 7 mm and 40 mm, respectively. Three welding protrusions 2 are provided at intervals of 120 degrees.

A magnet (permanent magnet) 9 is embedded near the distal end surface 6 of the supply rod 5 to attract and hold the flange 3 of the bolt 1 on the distal end surface 6. The flange 3 is received by the stopper piece 7 in a state of being held as illustrated by a two-dot chain line in FIGS. 1 and 2. Furthermore, the distal end surface 6 is inclined such that the bolt 1 faces downward with respect to a virtual plane perpendicular to the axis of the supply rod 5. The supply rod 5 is housed in the outer cylinder 10, and a piston rod 12 of an air cylinder 11 coupled to an end part of the outer cylinder 10 is connected to the supply rod 5.

Another magnet (permanent magnet) 13 is provided to assist entering of the bolt 1. The magnet 13 is housed in a holding container 14 and covered with a cover plate 15, and the holding container 14 is fixed to the lower end of the outer cylinder 10. Here, the fixing is performed by welding. The magnet 13 may be replaced with an electromagnet.

This embodiment describes the case where the bolt 1 is inserted into a hole 17 of a hollow guide pin used for positioning of a steel plate 16. Therefore, when the supply rod 5 advances to and stops at a position shown by the two-dot chain line as in FIG. 1, the entire device needs to be lowered as described later, and then the attraction force of the magnet 9 is eliminated to drop and insert the bolt 1.

For this reason, the supply rod 5 includes a hollow shaft 18 and an inner shaft 19 slidably inserted inside the hollow shaft, and a restricting pin 20 fixed near the upper end of the inner shaft 19 passes through a long hole 21 formed in the hollow shaft 18 in the stroke direction and protrudes as illustrated in the drawing.

An air cylinder 22 is fixed to the outer surface of the outer cylinder 10, an engaging piece 24 is coupled to a piston rod 23 of the air cylinder, and the engaging piece 24 protrudes into the outer cylinder 10 from a long hole 25 opened in the stroke direction in the outer cylinder 10. The tension of a compression coil spring 26 inserted into the hollow shaft 18 acts on the inner shaft 19, which causes the restricting pin 20 to abut on the lower side of the long hole 21. In this state, the end surfaces of the hollow shaft 18 and the inner shaft 19 form one plane to constitute the distal end surface 6 (see FIG. 2).

The hollow shaft 18 and the inner shaft 19 are made of stainless steel which is a non-magnetic body and are made so as not to cause sliding of both shafts to become heavy by magnetic attraction.

Although an example in which the magnet 9 is a permanent magnet is illustrated, it is also possible not to adopt this configuration, but to form the supply rod 5 with a single shaft made of iron and to penetrate the supply rod into an excitation coil to cause an attractive magnetic force to be applied to the end part of the single shaft, which enables the bolt 1 to be released at a required position by disconnecting the energization of the excitation coil. FIG. 5 illustrates the excitation coil 27.

A component supply pipe 28 (hereinafter, simply referred to as a supply pipe) that guides the bolt 1 is installed in a direction intersecting the stroke direction of the supply rod 5 at an acute angle as illustrated in the drawing, and an end part 29 of the component supply pipe is arranged in the vicinity of the distal end part of the supply rod 5. A stopper member 30 is formed at the distal end of the supply pipe 28 so as to close the pipe end.

The lower side of the end part 29, that is, the distal end part side of the supply rod 5 is formed as an outlet hole 31 as illustrated in the drawing. A holding piece 32 is installed at a portion of the outlet hole 31 in an advanceable and retractable state, and the shaft 4 of the bolt 1 descending the supply pipe 28 is locked between an inner surface 33 of the end part 29 and the holding piece 32 as illustrated in the drawing in a so-called temporarily locked positioning state. The inner surface 33 is curved as illustrated so as to bring the bolt 1 closer to the outlet hole 31.

The holding piece 32 is formed with a restricting surface 34 that comes into contact with the shaft 4, and the temporarily locked position of the shaft-like component 1 is set according to the installation position of the restricting surface 34.

In order to shorten the transition distance of the bolt 1, the outlet hole 31 is arranged as close as possible to the supply rod 5, and accordingly, the restricting surface 34 of the holding piece 32 is also arranged close to the stroke axis side of the supply rod 5. By doing this, a part of the component, that is, a part of the flange 3, is positioned on the supply rod advancing side of the distal end surface 6.

The holding piece 32 is configured to advance and retract in a direction perpendicular to the paper surface of FIGS. 1 and 2. A method of advancing and retracting the holding piece 32 is illustrated in FIG. 3, and an air cylinder 36 is fixed to a bracket 35 coupled to the outer cylinder 10, and a piston rod 37 is coupled to the holding piece 32.

The illustrated embodiment describes the case where the inclination angle of the supply rod 5 with respect to the vertical line is about 30 degrees, and the supply pipe 28 is welded so as to be positioned on the upper side of the outer cylinder 10 (see the reference sign 38).

The recess 8 formed in the stopper piece 7 has a circular arc surface shape as indicated by a reference sign 39 in order to receive the bolt 1 in a state of being exactly matched with the outer peripheral surface of the shaft 4 of the bolt 1. Thus, the flange 3 is firmly attracted to the distal end surface 6, whereas the shaft 4 is tightly received at the circular arc surface 39 of the recess 8, so that the holding stability of the component at the supply rod distal end part is improved.

Drive means 40 is provided in order to move the entire device, that is, the outer cylinder 10, the supply rod 5 in the outer cylinder, the air cylinder 11, the supply pipe 28, and others, in one piece into the hole 17 of the mating member. As this means, there is a method such as a rack pinion or a screw shaft, but here, an air cylinder 41 is adopted.

The air cylinder 41 is rigidly fixed to a stationary member 42, and a piston rod 43 of the air cylinder 41 is coupled to a bracket 44 welded to the outer cylinder 10. The entire device moves up and down by the output of the air cylinder 41.

A supply hose 45 made of synthetic resin and connected to the supply pipe 28 extends from a component feeder (not illustrated). In addition, the outer cylinder 10 and the supply pipe 28 are suitably made of, for example, stainless steel being a non-magnetic body, in order to strongly apply a magnetic force to the bolt 1.

Hereinafter, the operation is described. Before the bolt 1 is transferred, the holding piece 32 is advanced and the outlet hole 31 is closed by the restricting surface 34. The bolt 1 entering the supply pipe 28 from the supply hose 45 changes its direction while the distal end part of the shaft 4 is in contact with the inner surface 33 and abuts on the stopper member 30. At this time, because the attraction force of the magnets 9 and 13 acts on the bolt 1, particularly on the flange 3 and the shaft 4 near the flange, the entire bolt 1 is received by the restricting surface 34, and the temporarily locked position in FIGS. 1 and 2 is set.

Next, when the holding piece 32 is retracted by the air cylinder 36, the bolt 1 rapidly moves to the immediate side and is attracted to the distal end surface 6, and at the same time, the shaft 4 is received in the recess 8.

Next, when the supply rod 5 advances and the bolt 1 held at the distal end part of the supply rod comes close to the hole 17, the supply rod 5 stops at a position indicated by the two-dot chain line, the shaft 4 and the hole 17 become concentric with each other as is clear from FIG. 1, and then, by the entire device being lowered by the operation of the air cylinder 41, the shaft 4 is inserted into the hole 17.

Because the engaging piece 24 is pulled back by the air cylinder 22 almost simultaneously to the above, the restricting pin 20 is also pulled back at the same time, the displacement of the restricting pin 20 is transmitted to the magnet 9 through the inner shaft 19, and finally, the magnet 9 moves away from the flange 3 to cause the attractive force to the flange 3 to substantially disappear, and the bolt 1 falls into the hole 17.

The above concentric state and insertion of the shaft 4 into the hole 17 are realized by the inclination of the distal end surface 6 described above.

Note that because the method of realizing the operation order described above can be easily implemented by conventionally known sequence control, the description of the operation air control of the air cylinder and the like is omitted.

CITATIONS LIST

Patent Literature

Patent Literature 1: JP 2000-167730 A

SUMMARY OF INVENTION

Technical Problems

In the supply device described in the above Patent Literature, the air cylinder 22 that pulls back the inner shaft 19, the engaging piece 24 that advances and retracts by the air cylinder 22, the long hole 25 through which the engaging piece 24 penetrates, and others are arranged at a position separated from the lower end part of the outer cylinder 10. In addition, the holding piece 32 advances and retracts near the end part of the supply pipe 28, and the air cylinder 36 for advancing and retracting the holding piece are arranged near the end part 29 of the supply pipe 28.

Because the air cylinder 22 and the air cylinder 36 are arranged as described above, the air cylinders 22 and 36 have to be separated from each other. Therefore, there is a problem that compactness as a device cannot be sufficiently achieved. For example, because the air cylinders 22 and 36 need to protrude at different and separate places, or the air hoses need to be individually piped toward the separated air cylinders 22 and 36, there is a problem that a space for arranging the air cylinders and a space for piping need to be secured, and the supply device becomes difficult to install in relation to the peripheral devices.

The present invention has been provided to solve the above problems, and it is an object of the present invention to achieve compactness of a supply device by collectively arranging drive means such as an air cylinder.

Solution to Problems

One aspect of the present invention is a shaft-like component supply device having a form in which a component supply pipe that transfers a shaft-like component made of magnetic material and an outer cylinder that houses a supply rod of an advancing and retracting movement type are intersected at an acute angle and coupled, the supply rod holds and advances the shaft-like component at a distal end of the supply rod and releases the hold of the shaft-like component at a target location, and meanwhile, the component supply pipe has an outlet hole opened in a vicinity of the distal end of the supply rod and component transfer from the outlet hole to the distal end of the supply rod is performed by attraction force of a magnet, the component supply pipe being arranged with a holding piece that opens and closes the outlet hole in an advanceable and retractable state, the supply rod including an inner shaft whose distal end is mounted with a magnet configured to attract the shaft-like component and a hollow shaft having the inner shaft inserted so as to be able to slidably retract in the hollow shaft, and the shaft-like component supply device including first drive means configured to advance and retract the holding piece and second drive means configured to pull back the magnet of the inner shaft in a direction away from the distal end of the supply rod, the first drive means and the second drive means being coupled to a single holding member mounted in a vicinity of a distal end part of the outer cylinder.

Advantageous Effects of Invention

The supply rod housed in the outer cylinder includes the inner shaft mounted at the distal end with the magnet for attracting the shaft-like component, and a hollow shaft into which the inner shaft is slidably inserted. Further, the holding piece that opens and closes the outlet hole of the component supply pipe is arranged in the advanceable and retractable state. Therefore, when the supply rod advances over a predetermined length, both of the mechanism of pulling back the magnet of the inner shaft in the direction away from the distal end of the supply rod and the mechanism of advancing and retracting the holding piece for opening and closing the outlet hole of the component supply pipe are securely coupled with the holding member mounted to the outer cylinder as a core member.

That is, by the first drive means that advances and retracts the holding piece and the second drive means that pulls back the magnet of the inner shaft in the direction away from the distal end of the supply rod being coupled to the holding member mounted to the outer cylinder, both of the mechanisms are integrated in a compact form. For example, the supply device can be smoothly installed even in the case of space constraints, such as other structures approaching nearby. By arranging the holding member in the vicinity of the end part of the outer cylinder, the first drive means and the second drive means can be arranged close to each other, and the arrangement of electric wires, air hoses, and others is collected in one place. Therefore, the installation space of the supply device can be compacted, and the influence on nearby devices and the like can be minimized.

By forming the holding member mounted to the outer cylinder in predetermined dimensions and shape by, for example, bending a single long thick plate or joining a plurality of members, the first drive means and the second drive means constituted of air cylinders can have arrangement positions, arrangement postures, and the like freely set, which allows the drive means suitable for the function of the supply device to be arranged easily and is effective for making the supply device compact.

The holding member is formed of one member or formed by joining a plurality of members, and exists as a single member. Therefore, a plurality of drive means are coupled to one holding member, and the drive means can be collectively integrated, which is effective for making the device compact.

Because the holding member is mounted to the outer cylinder having high rigidity, the rigidity of the holding member itself is increased, and the mounting stability of the first drive means and the second drive means improves. At the same time, the shape can be simplified, which is effective in terms of a manufacturing aspect and the like.

DESCRIPTION OF EMBODIMENT

Next, a mode for implementing a shaft-like component supply device according to the present invention is described.

Example

The invention of the present application is an improvement of the invention described in Patent Literature 1. Therefore, the example of the invention of the present application is the supply device described above with reference to FIGS. 1 to 6 and the improvement applied thereto. This improvement is shown in FIGS. 7 to 11.

Therefore, in the description of the example of the present invention, only the difference from the supply device described with reference to FIGS. 1 to 6 is described, and the matters described with reference to FIGS. 1 to 6 are cited otherwise.

First, the drive means is described.

Figure 9:
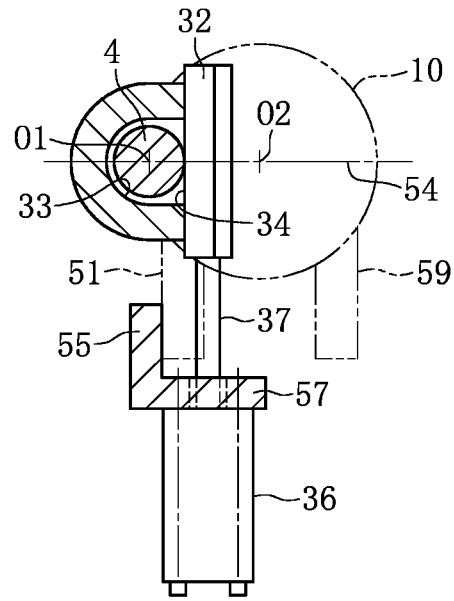
FIG. 9 is a cross-sectional view taken along (9)-(9) in FIG. 7.

As illustrated in FIG. 9, the holding piece 32 is advanced and retracted by the air cylinder 36 which is the first drive means. As the first drive means, an advancing and retracting output-type electric motor or the like can be adopted other than the air cylinder 36.

Figure 7:
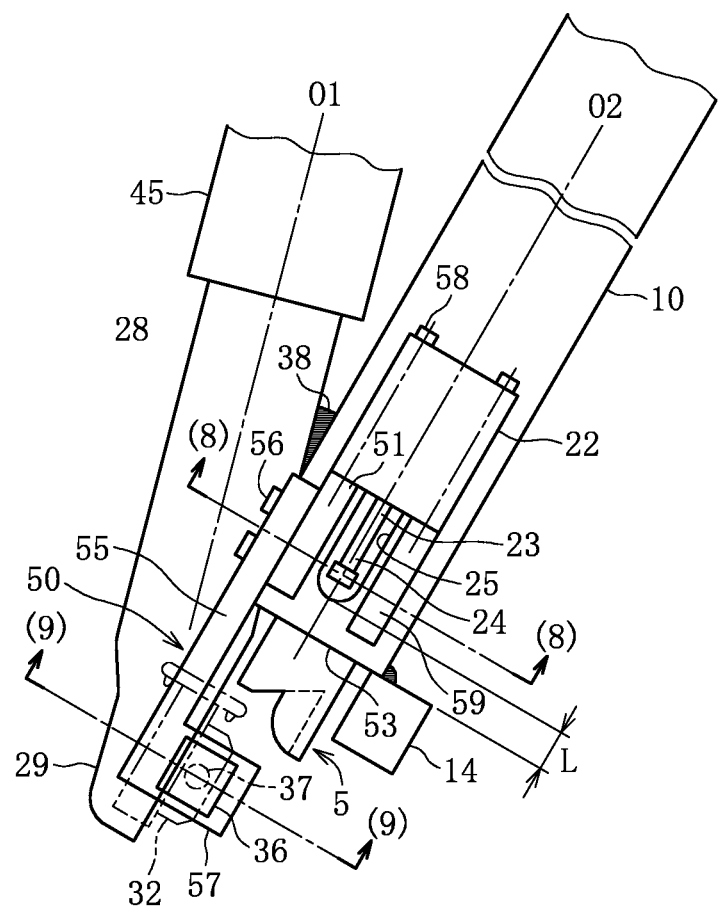
FIG. 7 is a side view of a main portion of a supply device.
Figure 8:
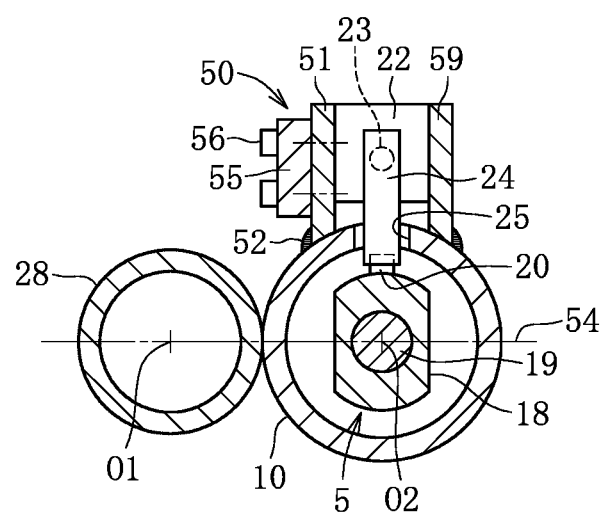
FIG. 8 is a cross-sectional view taken along (8)-(8) in FIG. 7.

As illustrated in FIGS. 7 and 8, the inner shaft 19 including the permanent magnet 9 is advanced and retracted by the air cylinder 22 which is the second drive means. As the second drive means, an advancing and retracting output-type electric motor or the like can be adopted other than the air cylinder 22.

Next, the holding member is described.

The supply pipe 28 and the outer cylinder 10 are welded at a position indicated by the reference sign 38. The supply pipe 28 and the outer cylinder 10 both have a circular cross-sectional shape. A center axis O1 of the supply pipe 28 and a center axis O2 of the supply rod 5 and the outer cylinder 10 both exist on a virtual plane 54 as illustrated in FIG. 8. An intersecting angle between the center axes O1 and O2 is an acute angle as described above.

Figure 10:
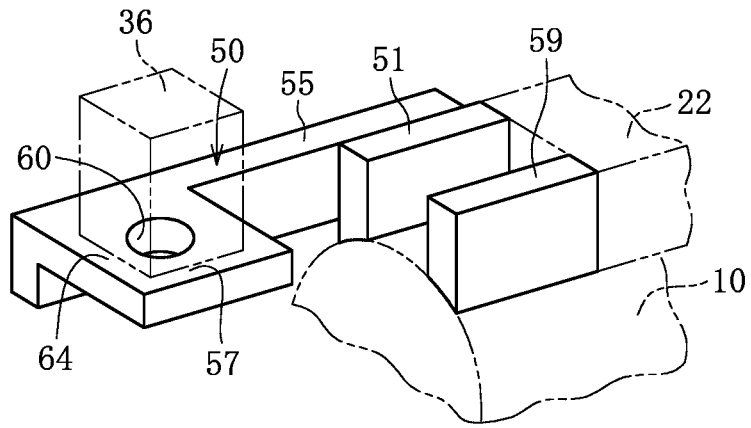
FIG. 10 is a perspective view of a holding member.

The entire holding member is denoted by a reference sign 50. The holding member 50 is formed as a single holding member 50 by forming a thick plate made of stainless steel or joining a plurality of plate members. The holding member 50 illustrated in FIG. 10 is a type in which a plurality of plate members are joined. As shown in FIG. 8, a rectangular fixed thick plate 51 is welded to the outer cylinder 10. A portion filled in black is a welded portion 52.

The fixed thick plate 51 is welded at a position close to an end part 53 of the outer cylinder 10 such that the longitudinal direction of the fixed thick plate is the same as the advancing and retracting direction of the supply rod 5. The standing direction of the fixed thick plate 51 is perpendicular to the virtual plane 54.

An extension member 55 extending in the advancing direction of the supply rod 5 is joined to the fixed thick plate 51. The joining in this case is a type in which a fixing bolt 56 is screwed. Alternatively, welding may be used. The distal end part of the extension member 55 is bent to form a mounting plate 57.

The end surface of the air cylinder 22 serving as the second drive means is abutted against the end surface of the fixed thick plate 51, and the air cylinder 22 is coupled to the fixed thick plate 51 using a long fixing bolt 58. The arrangement posture of the air cylinder 22 is such that the piston rod 23 thereof is parallel to the center axis O2. Here, in order to increase the mounting rigidity of the air cylinder 22, an auxiliary thick plate 59 is welded in the same manner as the fixed thick plate 51, and the air cylinder 22 is coupled to the end surface of the auxiliary thick plate 59 using the fixing bolt 58.

The mounting plate 57 has a surface 64 that is parallel to the virtual plane 54, and the end surface of the air cylinder 36 serving as the first drive means is abutted against the surface 64 of the mounting plate 57 and is coupled to the mounting plate 57 with a structure similar to the fixing bolt 58 used in the coupling of the air cylinder 22. The arrangement posture of the air cylinder 36 is such that the piston rod 37 is directed differently, that is, in perpendicular to the center axis O1. That is, the advancing and retracting direction of the piston rod 37 is perpendicular to the virtual plane 54. A reference sign 60 denotes a through hole through which the piston rod 37 of the air cylinder 36 penetrates.

Because the air cylinder 36 and the air cylinder 22 are mounted to the holding member 50 in a state of protruding from the outer cylinder 10 as described above, the air cylinder 36 and the air cylinder 22 are arranged to protrude only on one side of the virtual plane 54.

The holding member 50 in which a plurality of members are integrated includes the fixed thick plate 51, the extension member 55, and the mounting plate 57, and constitutes the single holding member 50.

Next, arrangement of the engaging piece is described.

Figure 1:
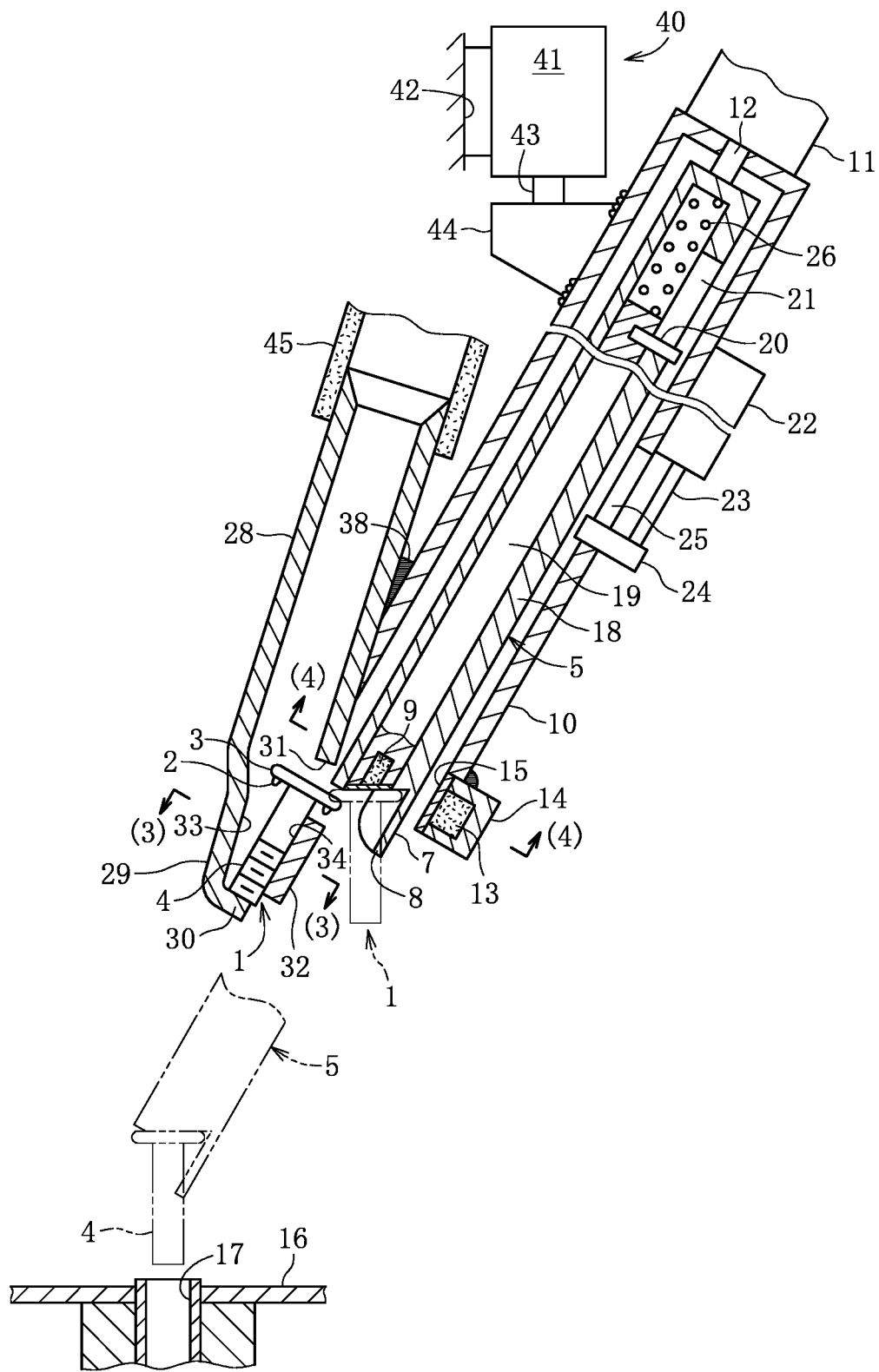
FIG. 1 is a cross-sectional view of the entire device.
Figure 2:
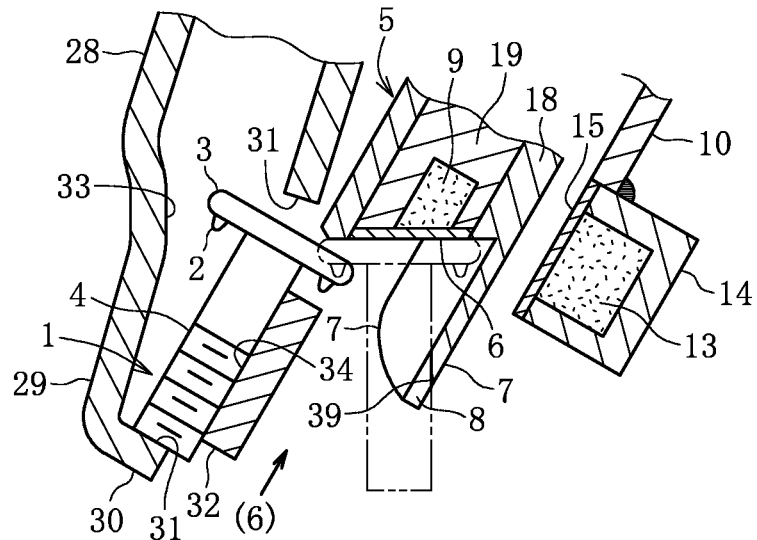
FIG. 2 is a cross-sectional view of a main portion.
Figure 3:
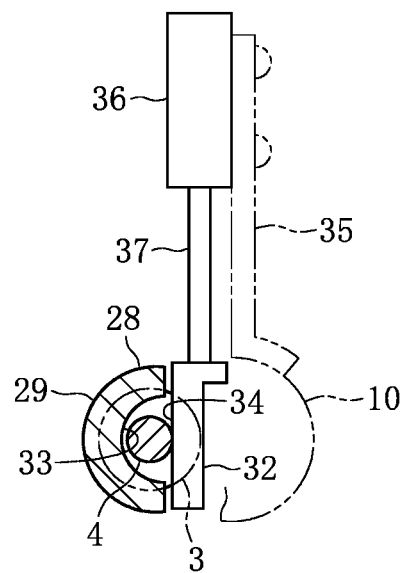
FIG. 3 is a cross-sectional view taken along (3)-(3) in FIG. 1.
Figure 4:
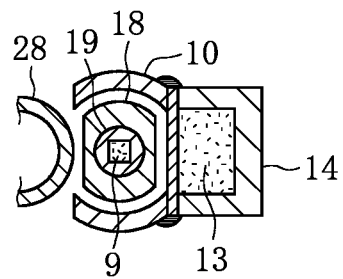
FIG. 4 is a cross-sectional view taken along (4)-(4) in FIG. 1.
Figure 5:
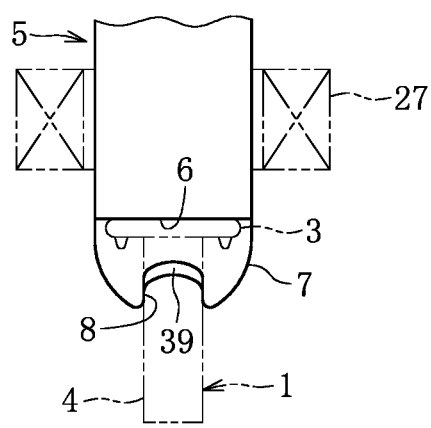
FIG. 5 is a front view illustrating a distal end part of a supply rod.
Figure 6:
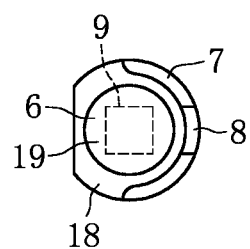
FIG. 6 is a diagram viewed from a direction of an arrow (6) in FIG. 2.

As illustrated in FIG. 7, the long hole 25 provided in the outer cylinder 10 is formed close to the end part 53 of the outer cylinder 10. As illustrated in FIG. 1, the engaging piece 24 penetrates the long hole 25 and protrudes into the outer cylinder 10. The distance between the restricting pin 20 when the supply rod 5 is most retracted and the engaging piece 24 waiting near the lower end of the long hole 25 is the maximum advancing length of the supply rod 5. Therefore, the maximum advancing length of the supply rod 5 is set by selecting the arrangement position of the restricting pin 20.

When the supply rod 5 advances by a predetermined length, the restricting pin 20 stops immediately before the engaging piece 24. In the case of the structure illustrated in FIG. 7, the end part of the long hole 25, the piston rod 23, and the engaging piece 24 are arranged between the fixed thick plate 51 and the auxiliary thick plate 59. With this arrangement, tools and the like are prevented from colliding with the piston rod 23 and the engaging piece 24 during maintenance work of the device.

Although the end part of the long hole 25 is arranged close to the end part 53 of the outer cylinder 10, an interval L between these two is desirably set to a distance equivalent to a quarter of the diameter of the outer cylinder 10 up to the diameter of the outer cylinder 10 in consideration of maintaining rigidity of the tube end part of the outer cylinder 10, shortening the length of the holding member 50, and the like. Setting the distance L as described above leads to shortening of the length of the holding member 50 as viewed in the direction of the center axis O2, and achieves the effect of the invention on compactness as described above.

Next, an example of another holding member is described.

Figure 11:
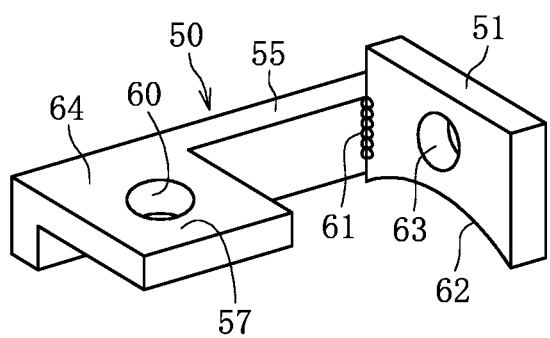
FIG. 11 is a perspective view of another holding member.

FIG. 11 shows another example of the holding member. This is obtained by changing the direction of the fixed thick plate 51 illustrated in FIG. 10 by 90 degrees, and the fixed thick plate 51 exists on a virtual plane intersecting the center axis O2 perpendicularly. The extension member 55 is welded to the fixed thick plate 51. This welded part is denoted by a reference sign 61. Because the orientation of the fixed thick plate 51 is changed as described above, the circular arc part 62 is formed at the lower end of the fixed thick plate 51 to match the cylindrical shape of the outer cylinder 10. It is suitable to weld the circular arc part 62 to the outer cylinder 10. A reference sign 63 denotes a through hole through which the piston rod 23 penetrates.

Although not illustrated in FIG. 11, similarly to FIG. 10, the end surface of the air cylinder 22 serving as the second drive means is abutted against the end surface of the fixed thick plate 51, and the air cylinder 22 is coupled to the holding member 50 using the long fixing bolt 58.

In each of the air cylinders 11, 22, 36, and 41, the air supply/discharge pipe is not illustrated.

Note that, instead of the various air cylinders described above, an electric motor that outputs advancing and retracting movement can also be adopted.

The advancing and retracting movement of the air cylinders described above can be easily performed by a generally adopted control method. By combining an air switching valve operated by a signal from a control device or a sequence circuit, a sensor that emits a signal at a predetermined position of an air cylinder and transmits the signal to the control device, and the like, a predetermined operation can be secured.

The operational effects of the examples described above are as follows.

The supply rod 5 housed in the outer cylinder 10 includes the inner shaft 19 mounted at the distal end with the magnet 9 for attracting the shaft-like component 1, and a hollow shaft 18 into which the inner shaft 19 is slidably inserted. Further, the holding piece 32 that opens and closes the outlet hole 31 of the component supply pipe 28 is arranged in the advanceable and retractable state. Therefore, when the supply rod 5 advances over a predetermined length, both of the mechanism of pulling back the magnet 9 of the inner shaft 19 in the direction away from the distal end of the supply rod 5 and the mechanism of advancing and retracting the holding piece 32 for opening and closing the outlet hole 31 of the component supply pipe 28 are securely coupled with the holding member 50 mounted to the outer cylinder 10 as a core member.

That is, by the first drive means 36 that advances and retracts the holding piece 32 and the second drive means 22 that pulls back the magnet 9 of the inner shaft 19 in the direction away from the distal end of the supply rod 5 being coupled to the holding member 50 mounted to the outer cylinder 10, both of the mechanisms are integrated in a compact form. For example, the supply device can be smoothly installed even in the case of space constraints, such as other structures approaching nearby. By arranging the holding member 50 in the vicinity of the end part of the outer cylinder 10, the first drive means 36 and the second drive means 22 can be arranged close to each other, and the arrangement of electric wires, air hoses, and others is collected in one place. Therefore, the installation space of the supply device can be compacted, and the influence on nearby devices and the like can be minimized.

By forming the holding member 50 mounted to the outer cylinder 10 in predetermined dimensions and shape by, for example, bending a single long thick plate or joining a plurality of members, the first drive means 36 and the second drive means 22 constituted of air cylinders can have arrangement positions, arrangement postures, and the like freely set, which allows the drive means suitable for the function of the supply device to be arranged easily and is effective for making the supply device compact.

The holding member 50 is formed of one member or formed by joining a plurality of members, and exists as a single member. Therefore, a plurality of drive means are coupled to one holding member 50, and the drive means can be collectively integrated, which is effective for making the device compact.

Because the holding member 50 is mounted to the outer cylinder 10 having high rigidity, the rigidity of the holding member 50 itself is increased, and the mounting stability of the first drive means 36 and the second drive means 22 improves. At the same time, the shape can be simplified, which is effective in terms of a manufacturing aspect and the like.

The center axis O1 of the supply pipe 28 and the center axis O2 of the supply rod 5 and the outer cylinder 10 both exist on the virtual plane 54, and the holding member 50 formed of a thick plate is installed so as to be in the upright posture perpendicular to the virtual plane 54. Therefore, by coupling the holding member 50 in the above posture to the vicinity of the intersecting and coupled portion between the supply pipe 28 and the outer cylinder 10, the first drive means 36 and the second drive means 22 can be arranged in a state of protruding only to one side of the supply pipe 28 and the outer cylinder 10, and as described above, the integrated space of the first drive means 36 and the second drive means 22 is minimized.

In other words, in the case where the first drive means 36 is arranged on one side of the virtual plane 54 and the second drive means 22 is arranged on the other side of the virtual plane 54, the mounting space required for both of the drive means 36 and 22 increases, or the arrangement space for electric wires, air hoses, and others increases. Therefore, the compactness as the supply device cannot be achieved. That is, the configuration in which the first drive means 36 and the second drive means 22 are arranged to protrude only on one side of the virtual plane 54 contributes to the compactness.

Because the welded joint portion 38 between the supply pipe 28 and the outer cylinder 10 and the welded portion 52 between the fixed thick plate 51 and the outer cylinder 10 are brought close to each other, the rigidity of this structural region can be enhanced. In addition, because the holding member 50 is welded to the outer cylinder 10, the holding member 50 can be arranged in a collected form at the welded joint portion 38, which is effective for compactness.

By arranging the engaging piece 24 pulled back by the air cylinder 22, the long hole 25 through which the engaging piece 24 penetrates, and the like close to the end part 53 of the outer cylinder 10, the holding member 50 can be arranged close to the end part 53 of the outer cylinder 10 when the permanent magnet 9 of the inner shaft 19 is pulled back. With this arrangement, the length of the holding member 50 as viewed in the advancing and retracting direction of the supply rod 5 can be made as short as possible, and the compactness of the supply device is promoted also in this aspect.

Arranging the engaging piece 24, the long hole 25 through which the engaging piece 24 penetrates, and the like close to the end part 53 of the outer cylinder 10 means arranging the engaging piece 24, the long hole 25 through which the engaging piece 24 penetrates, and the like close to the welded portion 38 between the supply pipe 28 and the outer cylinder 10. This improves the mounting rigidity of the holding member 50.

Although the end part of the long hole 25 is arranged close to the end part 53 of the outer cylinder 10, the interval L between these two is desirably set to a distance equivalent to a quarter of the diameter of the outer cylinder 10 up to the diameter of the outer cylinder 10. Setting the distance L as described above leads to shortening of the length of the holding member 50 as viewed in the direction of the center axis O2, and achieves the effect of the invention on compactness as described above, and meanwhile, becomes useful for maintaining the rigidity of the tube end portion of the outer cylinder 10 and shortening the length of the holding member 50.

INDUSTRIAL APPLICABILITY

As described above, according to the device of the present invention, the drive means such as the air cylinders can be collectively arranged, and the compactness of the supply device can be achieved. Therefore, the device can be used in a wide industrial field such as a vehicle body welding process of an automobile and a sheet metal welding process of a household electrical appliance.

REFERENCE SIGNS LIST

1 Shaft-like component, projection bolt
4 Shaft
5 Supply rod
6 Distal end surface
9 Permanent magnet
10 Outer cylinder
18 Hollow shaft
19 Inner shaft
20 Restricting pin
21 Long hole
22 Second drive means, air cylinder
24 Engaging piece
25 Long hole
28 Component supply pipe
31 Outlet hole
32 Holding piece
36 First drive means, air cylinder
50 Holding member
53 End part

The invention claimed is:
1. A shaft-shaped component supply device comprising:
a component supply pipe that transfers a shaft-shaped component made of magnetic material;
a supply rod configured to perform advancing and retracting movement; and
an outer cylinder that houses the supply rod; wherein
the component supply pipe and the outer cylinder are coupled to each other at an acute intersection angle,
the supply rod is configured to advance while holding the shaft-shaped component at a distal end of the supply rod and release the shaft-shaped component at a target location,
the component supply pipe has an outlet hole opened towards the distal end of the supply rod, the shaft-shaped component being transferred from the outlet hole to the distal end of the supply rod by an attraction force of a magnet,
the component supply pipe is arranged with a holding piece that opens and closes the outlet hole in an advanceable and retractable state,
the supply rod includes an inner shaft having a distal end with another magnet, the another magnet being configured to attract the shaft-shaped component, and a hollow shaft having the inner shaft inserted therein so as to be able to slidably retract in the hollow shaft, and the shaft-shaped component supply device further comprises:
a first drive means configured to advance and retract the holding piece;
a second drive means configured to pull back the another magnet of the inner shaft in a direction away from the distal end of the supply rod; and
a single holding member mounted at a distal end part of the outer cylinder, the first drive means and the second drive means being coupled to the single holding member so that the first drive means and the second drive means are arranged to protrude only on one side of a virtual plane including a center axis of the component supply pipe, a center axis of the supply rod and a center axis of the outer cylinder.

* * * * *